(12) United States Patent
Yang et al.

(10) Patent No.: US 11,944,215 B2
(45) Date of Patent: *Apr. 2, 2024

(54) VISION-BASED FRICTIONLESS SELF-CHECKOUTS FOR SMALL BASKETS

(71) Applicant: NCR Voyix Corporation, Atlanta, GA (US)

(72) Inventors: Qian Yang, Smyrna, GA (US); Frank Douglas Hinek, Decatur, GA (US); Dharamendra Kumar, Atlanta, GA (US); Matias Gabriel Szylkowski Resnikow, New York, NY (US); Brent Vance Zucker, Roswell, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,484

(22) Filed: Mar. 21, 2022

(65) Prior Publication Data

US 2022/0202210 A1  Jun. 30, 2022

Related U.S. Application Data (63) Continuation of application No. 17/341,699, filed on Jun. 8, 2021, now Pat. No. 11,375,827, which is a (Continued)

(51) Int. Cl.
| | |
|---|---|
| *G06Q 20/00* | (2012.01) |
| *A47F 9/04* | (2006.01) |
| *G06F 3/0488* | (2022.01) |
| *G06N 20/00* | (2019.01) |
| *G06Q 20/18* | (2012.01) |

(Continued)

(52) U.S. Cl.
CPC ............ *A47F 9/048* (2013.01); *G06F 3/0488* (2013.01); *G06N 20/00* (2019.01); *G06Q 20/18* (2013.01); *G06Q 20/208* (2013.01); *G06T 7/74* (2017.01); *G06V 10/40* (2022.01); *G06V 10/764* (2022.01); *G06V 10/809* (2022.01); *G06V 20/64* (2022.01); *G07G 1/0063* (2013.01); *G07G 1/0072* (2013.01); *G06T 2207/20132* (2013.01); *G06V 20/68* (2022.01); *G06V 2201/10* (2022.01)

(58) Field of Classification Search
CPC ........... A47F 9/048; G06T 7/74; G06N 20/00; G06V 10/443; G06F 3/0488; G06Q 20/18; G06Q 20/208; G07G 1/0063; G07G 1/0072
USPC ....................................................... 235/383
See application file for complete search history.

(56) References Cited

U.S. PATENT DOCUMENTS

| | | | |
|---|---|---|---|
| 11,134,798 B1 * | 10/2021 | Yang | ........................ G06Q 20/18 |
| 11,375,827 B2 * | 7/2022 | Yang | ........................ G06V 10/40 |
| 2019/0065823 A1 * | 2/2019 | Srivastava | ........... G01B 11/245 |

* cited by examiner

*Primary Examiner* — Daniel A Hess
(74) *Attorney, Agent, or Firm* — Schwegman Lundberg & Woessner, P.A.

(57) ABSTRACT

A vison-based self-checkout terminal is provided. Purchased items are placed on a base and multiple cameras take multiple images of each item placed on the base. A location for each item placed on the base is determined along with a depth and the dimensions of each item at its given location on the base. Each item's images are then cropped, and item recognition is performed for each item on that item's cropped images with that item's corresponding depth and dimension attributes. An item identifier for each item is obtained along with a corresponding price and a transaction associated with items are completed.

19 Claims, 4 Drawing Sheets

Related U.S. Application Data continuation of application No. 16/915,035, filed on Jun. 29, 2020, now Pat. No. 11,134,798.

(51) Int. Cl.
*G06Q 20/20* (2012.01)
*G06T 7/73* (2017.01)
*G06V 10/40* (2022.01)
*G06V 10/764* (2022.01)
*G06V 10/80* (2022.01)
*G06V 20/64* (2022.01)
*G07G 1/00* (2006.01)
*G06V 20/68* (2022.01)

VISION-BASED FRICTIONLESS SELF-CHECKOUTS FOR SMALL BASKETS

CROSS-REFERENCE TO RELATED APPLICATIONS

This application is a continuation of U.S. patent application Ser. No. 17/341,699, filed Jun. 8, 2021, which is a continuation of U.S. patent application Ser. No. 16/915,035, filed Jun. 29, 2020, which applications and publications are incorporated herein by reference in their entirety.

BACKGROUND

Currently, retailers and customers obtain a Universal Product Code (UPC) for an item during a checkout by scanning item barcodes placed on items. However, scanning a barcode is sometimes inconvenient and not every item is suitable for putting paper labels on.

Convenience stores usually have small baskets and checkouts involve store assistants available to assist shoppers to enter or scan item codes (UPC) at Point-Of-Sale (POS) terminals operated by the store assistants. Unfortunately, convenience stores lack the physical space to install Self-Service Terminals (SSTs), which would allow the shoppers to perform self-checkouts with their items.

As a result, convenience stores can become really busy with shoppers queued in one or two queues to checkout with store assistants. Some shoppers who are buying only a few items that are not really needed may elected to put the item down and exit the store without making a purchase. These situations can be problematic for small community-based convenience stores that rely on a large quantity of transactions having a small number of purchased items on average for each transaction.

SUMMARY

In various embodiments, a system, a method, and a terminal for vision-based frictionless self-checkouts for small baskets of items are presented.

According to an embodiment, a method for vison-based transaction processing is provided. Three images are obtained within a scan zone of a vision-based transaction terminal. An item item location is determined for each item present within scan zone from the three images. Pixels associated with each item are cropped out from each of the three images creating three cropped images for each item present within the scan zone. Each item is categorized into an item category based on each item's three cropped images. Each item is recognized with a unique item identifier based on the corresponding item category and the corresponding item's three cropped images. Each item identifier is provided to a transaction manager of the vision-based transaction terminal to process a transaction at the vision-based transaction terminal.

DETAILED DESCRIPTION

Figure 1A:
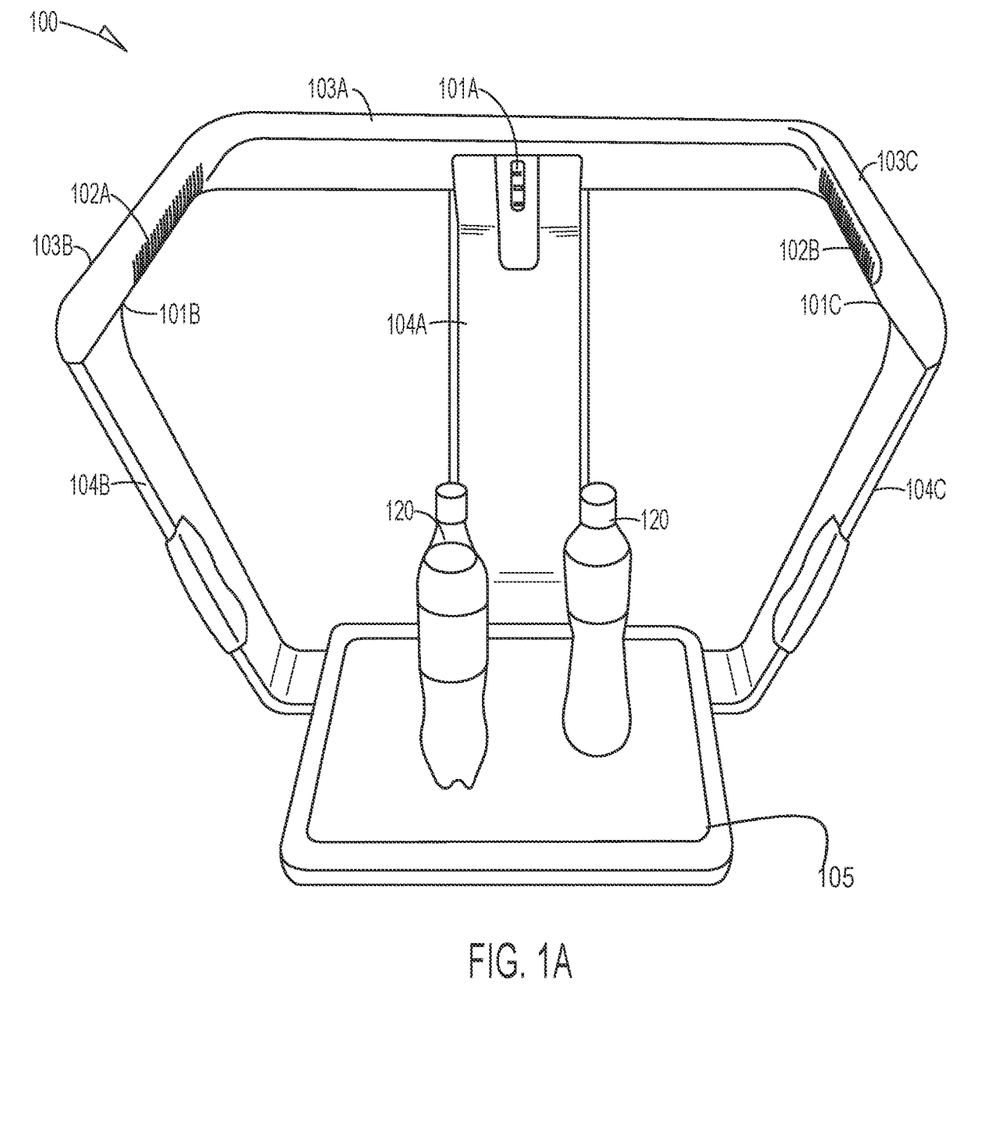
FIG. 1A is a diagram of a vison-based transaction terminal, according to an example embodiment.

FIG. 1A is a diagram of a vision-based transaction terminal 100, according to an example embodiment.

The vision-based transaction terminal 100 comprises an elevated first center camera 101A, an elevated right camera 101B, an elevated left camera 101C, an optional elevated right speaker 102A, an optional elevated left speaker 102B, a center horizontal brace (bar) 103A, a right horizontal brace (bar) 104B, a left horizontal brace (bar) 103C, a center vertical brace (bar) 104A, a right vertical brace (bar) 104B, a left vertical brace (bar) 104C, and a horizontal base 105 (base 105 may optionally include an integrated weigh scale 105).

It is noted that other components of the vision-based transaction terminal 100 are discussed below with the FIGS. 1B and 1C.

The area comprised inside of bars 103A-103C and 104A-104C above base 105 represents a target zone for which cameras 101A-101C are focused for purposes of each three cameras 101A-101C to capture three images for anything placed on base 105 within the target zone.

Right vertical bar 104B is attached to a right side of base 105 and extends vertically upward at an obtuse angle to the top horizontal surface of base 105. Similarly, left vertical bar 104C is attached to a left side of base 105 and extends vertically upward at the obtuse angle to the the top horizontal surface of base 105. Center bar 104A is attached to a rear side of base 105 and extends upward at an obtuse angle to the horizontal surface of the base 105 or at a substantially right angle to to the horizontal surface of base 105.

Right horizontal bar 103B, center horizontal bar 103A, and left horizontal bar 103C form a U-shape, with a first outer end of right bar 103B attached to a top of right vertical bar 104B. Center horizontal bar 103A is attached to a top of center/back vertical bar 104A on an underside of center horizontal bar 103A. Left horizontal bar 103C is attached on the underside of left horizontal bar 103C to a top of left vertical bar 104C.

Moreover, right vertical bar 104B is angled forward and away from center horizontal bar 103A. Similarly, left vertical bar 104C is angled forward and away from center horizontal bar 103A. Each vertical bar 104A-104C includes a bend at the ends which attach to sides of base 105 before the remaining portions of bars 104A-104C are angled at the obtuse angles from a top surface of base 105.

In an embodiment, base 105 includes an integrated weight scale 105 to weight items requiring weights for item pricing.

Center camera 101A is integrated into or affixed to a substantial center of center horizontal bar 103A. Right camera 101B is integrated into or affixed to right horizontal bar 103B at the end affixed to right vertical bar 104B. Left camera 101C is integrated into or affixed to left horizontal bar 104C at the end affixed to left vertical bar 104C. Wiring and hardware associated with cameras 101A-101C are passed inside a housing of bars 103A-103C and 104A-104C. Power and a Universal Serial Bus (USB) port for vison-based terminal 100 is located on a bottom rear side of center vertical bar 104A. Similarly, wiring and hardware for an integrated weigh scale 105 is enclosed in a housing of base/scale 105.

When one or more items 120 are placed on the top surface of terminal 100, cameras 101A-101C capture images of the one or more items. Three images are taken and processed in the manners discussed herein and below for item recognition and for item processing during a transaction.

Figure 1B:
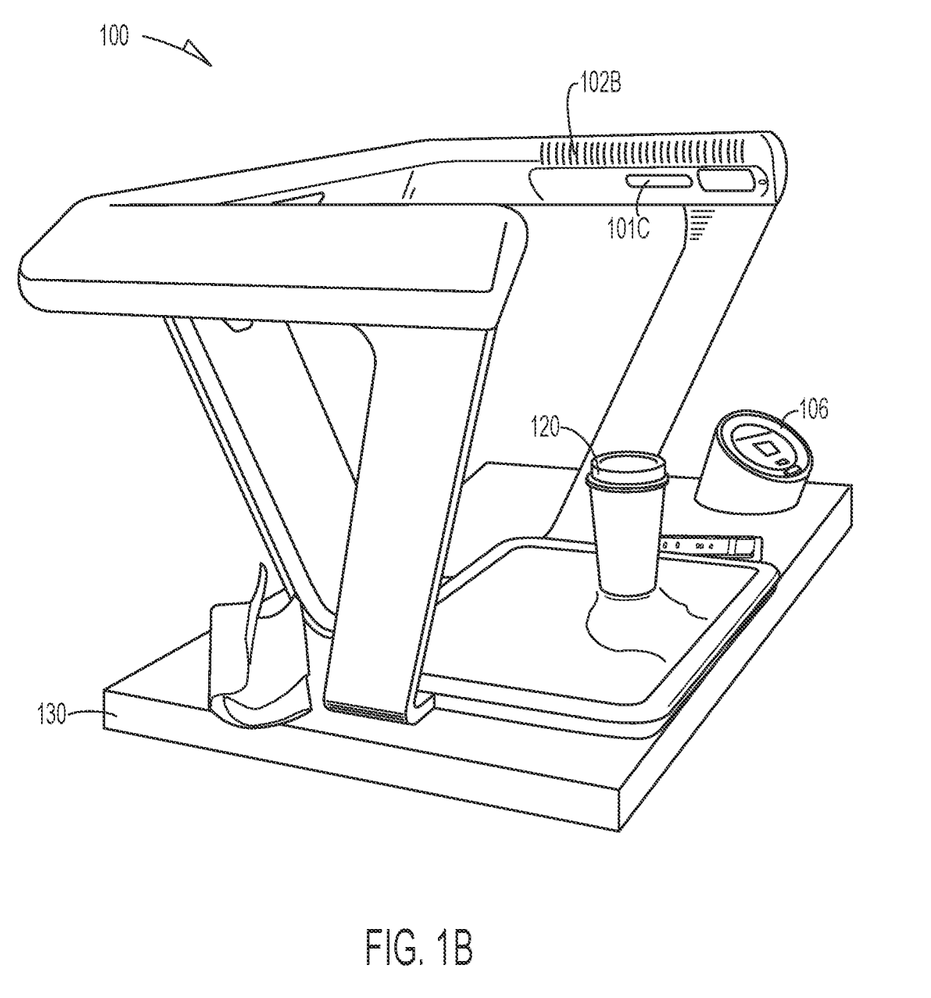
FIG. 1B is a diagram of a side view of the vision-based transaction terminal, according to an example embodiment.

FIG. 1B is a diagram of a side view of the vision-based transaction terminal 100, according to an example embodiment.

In FIG. 1B terminal 100 includes a connected touch display 106. Touch display 106 can also server as the processing core for terminal 100. Touch display 106 may be a modified and enhanced version of existing network-based and voice-enabled Internet-Of-Things (IoTs) devices, such as Google Home®, Amazon Echo®, etc.

In an embodiment, touch display 106 is a modified or enhanced version of an existing tablet computer.

The entire terminal 100 with connected touch display and/or processing core 106 is compact enough to side on a countertop 130, such that terminal 100 occupies substantially less space than a conventional SST and is well suited for deployment in retail environments where physical space is at a premium, such as convenience stores.

In an embodiment, other peripheral devices, such as receipt printers, cash drawers, card readers, etc. may be interfaced to terminal 100 through the connected touch display and/or processing core 106. Such connections may be wireless and/or wired.

Terminal 100 may be operated in a self-service mode by customers with assistance or placed in an assistant mode of operation for which an assistant assist a customer with a checkout at terminal 100. In the self-service mode, the terminal 100 is an SST. In the assistant mode, the terminal is a POS terminal and may include an interfaced cash drawer.

The manager in which terminal 100 utilizes cameras 101A-101C and any integrated weigh scale 105 with the connected touch display and/or processing core 105 is now discussed with reference to FIG. 1C.

Figure 1C:
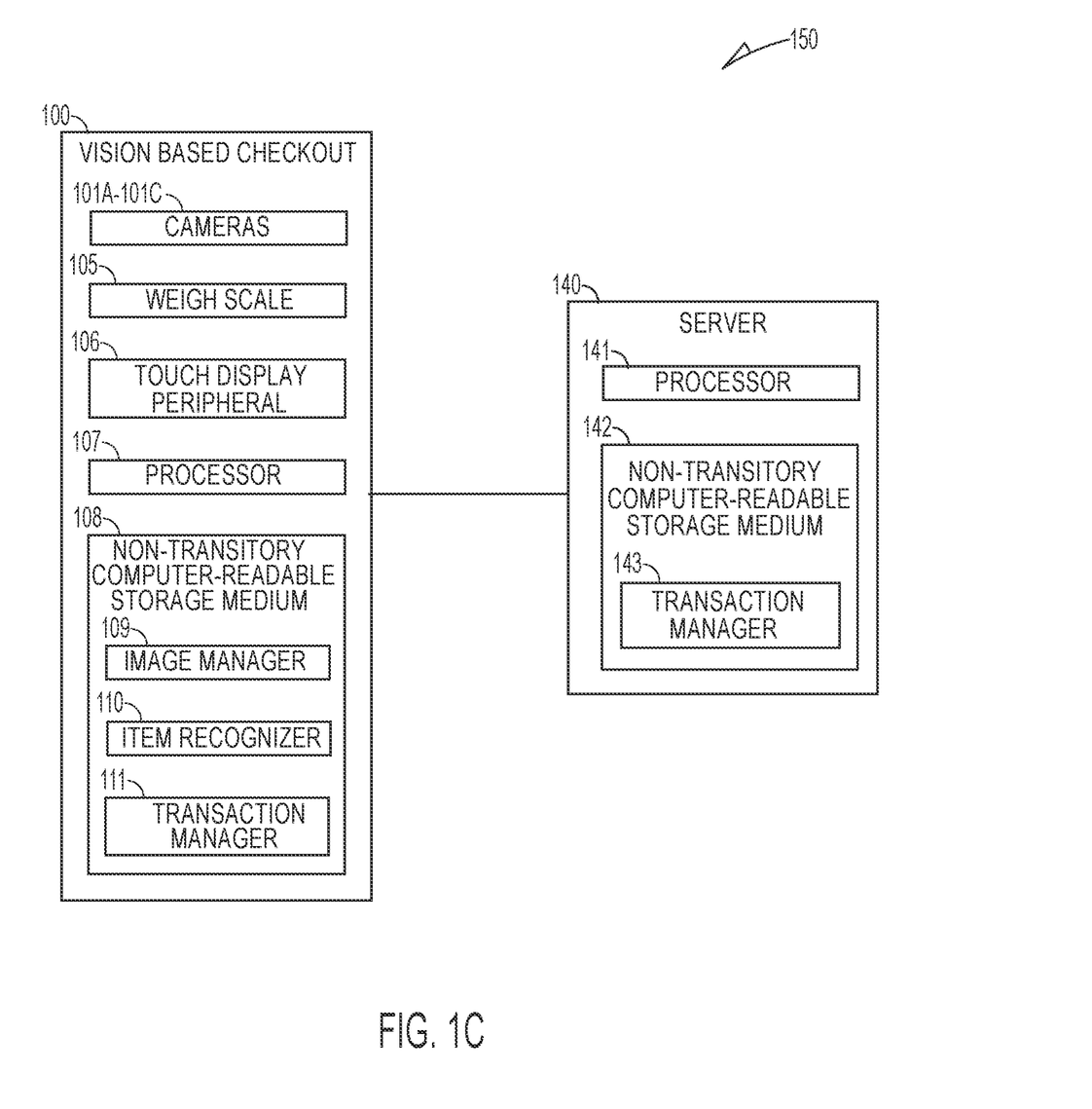
FIG. 1C is a diagram of a vision-based transaction terminal and a system for vision-based transaction processing, according to an example embodiment.

FIG. 1C is a diagram of a vision-based transaction terminal 100 and a system 150 for vision-based transaction processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of vision-based transaction processing, presented herein and below.

The system 150 comprises the vision-based transaction terminal 100 and a server 140. The vision-based transaction terminal 100 comprises three cameras 101A-101C, a right speaker 102A, a left speaker 102B, a touch display peripheral 106, a processor 107, and a non-transitory computer-readable storage medium 108 comprising executable instructions representing an image manager 109, an item recognizer 110, and a transaction manager 111. The server 140 comprises a processor 141 and a non-transitory computer-readable storage medium 141 comprising executable instructions representing a transaction manager 142.

In an embodiment and as was discussed above, processor 107 and non-transitory computer-readable storage medium 108 having image manager 108, item recognizer 110, and transaction manager 111 may physical reside within a housing associated with touch display 106 and connected to a communication port to a rear bottom portion of center vertical bar 104A.

When a weight is detected on base/scale 105 and/or when cameras 101A-101C detect one or more items within the target zone residing between vertical bars 104A-104C and on top of base/scale 105, cameras 101A-101C capture an image of the target zone. Each camera 101A-101C captures and provides its own independent and separate image of the target zone.

Assuming touch display 106 was not previously interacted with by a customer to start a transaction with transaction manager 111, the presence of one or more items in the target zone initiates a start of transaction with transaction manager 111.

The vision-based self checkout terminal 100 uses three cameras 101A-101C to process for depth information from multi-views of the one or more items within the target zone to solve occlusions of multiple items, which may have been placed in the target zone (may also be referred to herein as "scan zone"). Real-time object/item detection and classification models are processed by item recognizer 110 to recognize the items placed in the scan zone. An Application Programming Interface (API) consumes the image data provided by image manager 109, load recognition models obtained by image recognizer 110, and add item identifiers for the items within the scan zone are added to the customer's transaction (may also be referred to as a customer's cart"). The cart is updated and connected to other endpoints via a web socket to transaction manager 143 of server 140 for purposes of obtaining pricing details of the items and obtaining/confirming payment at terminal 100 for the transaction/cart.

Cameras 101A-101C capture two-dimensional (2D) Red-Green-Blue and depth-sensitive images of the scan zone to image manager 109. Image manager 109 transforms the images from different views into a common view. Item recognizer 110 performs real-time item detection and classification to recognize each item placed within the scan zone. A three-dimensional (3D) mapper maps pixels from the images to specific locations within the scan zone. Item recognizer 110 utilizes an API for multi-view matching to identify each unique item within a combination of items presented within the scan zone and a web socket-based update by transaction manager 111 permits cart updating with transaction manager 143.

Image manager 109 obtains the three images taken by cameras 101A-101C of the items within the scan zone. The location in the pixels of each image is then mapped to physical locations within the scan zone using depth-based image processing. The location is relative to the cameras 101A-101C and mapped to the corresponding item within the scan zone.

Image manager 109 then obtains three separate images for each item present within the scan zone and crops the pixels associated with each item in the three images based on the location determined for that item within the scan zone. At a result, each item present within the scan zone is associated with its own separate cropped image comprise those pixels associated with that specific item. Moreover, each of the three images for a single item are taken at different angles (because each camera 101A-101C is positioned to capture its images at a different angle from that which is associated with the remaining cameras 101A-101C).

The cropped 3 images for each item present for the items in the scan zone are then passed by image manager 109 to item recognizer 110. Item recognizer then utilizes item recognition models for purposes of classifying each item based on that item's three cropped images taken at the different angles and identifies each item providing a corresponding item identifier to transaction manager 111. In an embodiment, item recognizer 110 utilizes a trained machine learning algorithm by passing the cropped images for each item and item classifications to the algorithm and obtaining as output an item identifier for each item.

By using location information for known locations of items placed in the scan zone, three separate images for a single item can be obtained through cropping from the original three images taken by cameras 101A-101C. So, for 2 items there are three original images taken by the three cameras 101A-101C. Image manager 109 uses depth processing and known locations and for each lens of each camera 101A-101C to distinctly identify the unique pixels in each of the three original images for each of the 2 items and crops each item's pixels, such that each item is associated with three images and there are six total images (each image associated with its own three-cropped images. This substantially reduces the item recognition processing needed by item recognizer 110 and further makes item recognition more accurate for item recognizer 110.

Item recognizer 110 can then uses models, pixel features, edge detection, color attributes, dimensions, etc. to classify the three images for each item into item categories and perform item recognition on the item. An item identifier is then provided to transaction manager 111 and transaction manager 111 interacts with transaction manager 143 to obtain item details and item pricing allowing the cart/transaction to be updated and subsequently paid for by the customer at terminal 100.

It is noted that the terminal 100 is presented for illustration and the recited dimensions and configuration of components for terminal 100 provide one embodiment of terminal 100. More or less components arranged in other dimensions and configurations that utilize the 3 cameras 101A-101C for performing vision-based self-checkouts are intended to also fall within the scope of the teachings presented herein.

These embodiments and other embodiments are now discussed with reference to the FIG. 2.

Figure 2:
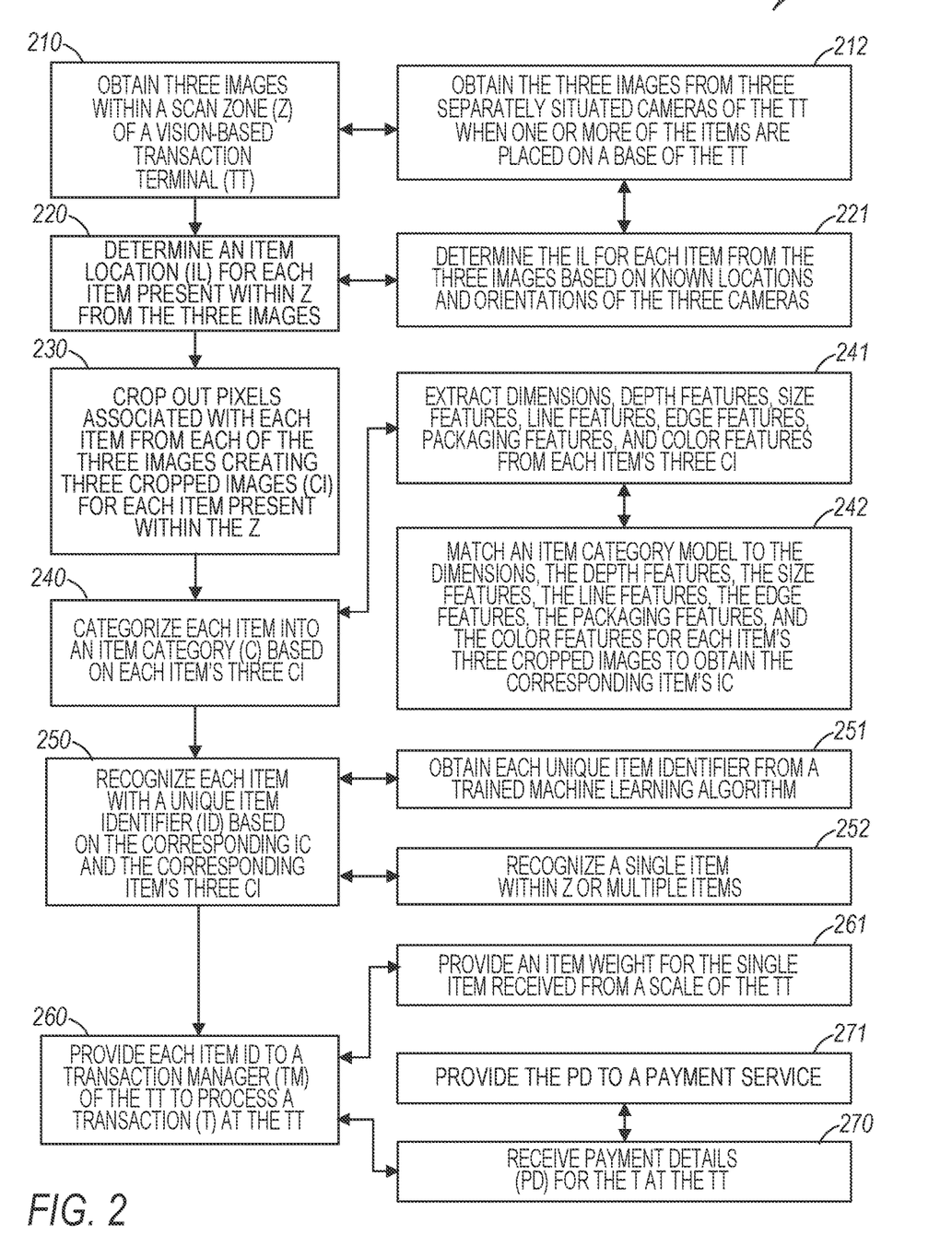
FIG. 2 is a diagram of a method for transaction processing by a vision-based transaction terminal, according to an example embodiment.

FIG. 2 is a diagram of a method 200 for transaction processing by a vision-based transaction terminal, according to an example embodiment. The software module(s) that implements the method 200 is referred to as a "vison-based transaction manager." The vison-based transaction manager is implemented as executable instructions programmed and residing within memory and/or a non-transitory computer-readable (processor-readable) storage medium and executed by one or more processors of a device. The processor(s) of the device that executes the vison-based transaction manager are specifically configured and programmed to process the vison-based transaction manager. The vison-based transaction manager has access to one or more network connections during its processing. The network connections can be wired, wireless, or a combination of wired and wireless.

In an embodiment, the vison-based transaction terminal 100 executes the vison-based transaction manager. In an embodiment, the terminal 110 is an SST operated by a customer during a transaction or a POS terminal operated by an attendant on behalf of a customer during a transaction.

In an embodiment, the vison-based transaction manager is all or some combination of image manager 109, item recognizer 110, and/or transaction manager 111.

At 210, the vison-based transaction manager obtains three images within a scan zone of a vision-based transaction terminal.

In an embodiment, at 211, the vison-based transaction manager obtains the three images from three separately situated cameras of the vision-based transaction terminal when one or more of the items are placed on a base of the vision-based transaction terminal.

At 220, the vison-based transaction manager determines an item location for each item present within scan zone from the three images.

In an embodiment, at 221, the vision-based transaction manager determines the item location for each item from the three images based on known locations and orientations of the three cameras.

At 230, the vison-based transaction manager crops out pixels associated with each item from each of the three images creating three cropped images for each item present within the scan zone.

At 240, the vison-based transaction manager categorizes each item into an item category based on each item's three cropped images.

In an embodiment, at 241, the vision-based transaction manager extracts dimensions, depth features, size features, line features, edge features, packaging features, and color features from each item's three cropped images.

In an embodiment of 241 and at 242, the vision-based transaction manager matches an item category model to the dimensions, the depth features, the size features, the line features, the edge features, the packaging features, and the color features for each item's three cropped images to obtain the corresponding item's item category.

At 250, the vison-based transaction manager recognizes each item with a unique item identifier based on the corresponding item category and the corresponding item's three cropped images.

In an embodiment, at 251, the vision-based transaction manager obtains each unique item identifier for each item from a trained machine learning algorithm.

In an embodiment, at 252, the vision-based transaction manager recognizes a single item as being present within the scan zone or recognizing more than one item as being present within the scan zone.

At 260, the vison-based transaction manager provides each item identifier to a transaction manager of the vision-based transaction terminal to process a transaction at the vision-based transaction terminal.

In an embodiment of 252 and 260, at 261, the vision-based transaction manager provides an item weight for the single item, wherein the item weight is received from an integrated scale of the vision-based transaction terminal.

In an embodiment, at 270, the vison-based transaction manager receives payment details for the transaction at the vision-based transaction terminal.

In an embodiment of 270 and at 271, the vison-based transaction manager provides the payment details to a payment service over a network connection to complete the transaction.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    obtaining multiple images of a scan zone during a checkout at a transaction terminal from cameras integrated into or attached to the transaction terminal and each camera captures a different overhead view of the scan zone at a different angle from remaining cameras, wherein at least one of the cameras is an elevated centered overhead camera relative to the scan zone, wherein the cameras include three cameras each situated on one of three vertical bars of the transaction terminal and attached to the corresponding top of a corresponding vertical bar, each vertical bar extending upward from a base of the transaction terminal at an obtuse angle;
    processing the multiple images to identify each item present in the scan zone based at least on a calculated distance between each camera and a corresponding item present in the scan zone using the corresponding image captured by the corresponding camera; and
    providing an item identifier for each item to the transaction terminal for item information and item pricing used during the checkout.

2. The method of claim 1, wherein processing counting a total number of items within the scan zone using the multiple images.

3. The method of claim 2, wherein counting further includes mapping each item detected within the multiple images to a specific location within the scan zone.

4. The method of claim 3, wherein mapping further includes cropping each item from the multiple images into an item-specific set of cropped images.

5. The method of claim 4, wherein cropping further includes classifying each item-specific set of cropped images into a specific item category.

6. The method of claim 5, wherein classifying further includes obtaining a model image for each specific item category and comparing features from the corresponding item specific set of cropped images against the corresponding model image to identify each item.

7. The method of claim 4, wherein classifying further includes performing edge detection on each item from the corresponding item-specific set of cropped images to produce a corresponding modified item-specific set of cropped images for the corresponding item.

8. The method of claim 7, wherein performing further includes calculating dimensions for each item from the corresponding modified item specific set of cropped images to produce corresponding second modified item specific set of cropped images for the corresponding item.

9. The method of claim 8, wherein calculating further includes deriving color attributes for each item in the corresponding second modified item specific set of cropped images for the corresponding item.

10. The method of claim 9, wherein deriving further includes classifying the color attributes for each item in each corresponding second modified item specific set of cropped images into a specific item category, obtaining a model image for each specific item category and comparing visual features from the corresponding second modified item specific set of cropped images against the corresponding model image to identify each item.

11. A method, comprising:
    obtaining multiple images of a scan zone associated with a transaction terminal, wherein obtaining the multiple images further includes obtaining three images of the scan zone from three depth cameras integrated into or affixed to a top portion of the transaction terminal, each depth camera providing an independent overhead image of the scan zone captured at a specific angle and a specific distance from the scan zone, where at least one of the cameras is an elevated centered overhead camera relative to the scan zone, wherein each depth cameras situated on one of three vertical bars of the transaction terminal and attached to the corresponding top portion of a corresponding vertical bar, each vertical bar extending upward from a base of the transaction terminal at an obtuse angle;
    identifying a total number of items present in the scan zone from each of the multiple images based at least on a calculated distance between each depth camera and a corresponding item present in the scan zone using the corresponding image captured by the corresponding depth camera;
    cropping each item into a set of independent images, each independent image depicting the corresponding item;
    determining dimensions of each item from the corresponding set of independent images;
    determining edges of each item from the corresponding set of independent images;
    determining visual features of each item from the corresponding set of independent images;
    classifying each item into an item-specific category based on the corresponding dimensions, the corresponding edges, and the corresponding visual features;
    obtaining a model image for each item-specific category of each item and comparing known dimensions, known edges, and known visual features of the corresponding model image against the dimensions, the edges, and the visual features of the corresponding item to identify an item identifier for the corresponding item; and
    providing the corresponding item identifier for each corresponding item to the transaction terminal during a checkout at the transaction terminal.

12. The method of claim 11, wherein providing further includes obtaining item information and item pricing for each item identifier and providing the item information and item pricing for each item identifier to the transaction terminal during the checkout.

13. The method of claim 11, wherein identifying further includes identifying a single item within the scan zone and obtaining an item weight from a weigh scale interfaced to a base of the transaction terminal.

14. The method of claim 13, wherein providing further includes providing the item weight to the transaction terminal with the item identifier.

15. The method of claim 11, wherein cropping further includes determining a location of each item within the scan zone and using the location of each item to crop each item into the corresponding set of independent images.

16. The method of claim 11, wherein determining the location further includes using depth information provided with the multiple images to identify the location of each item within the scan zone.

17. The method of claim 11, wherein obtaining the multiple images further includes obtaining three images of the scan zone from three depth cameras integrated into or affixed to a top portion of the transaction terminal, each depth camera providing an independent overhead image of the scan zone captured at a specific angle and a specific distance from the scan zone.

18. A system, comprising:
a transaction terminal;
three cameras affixed to or integrated into a top portion of the transaction terminal wherein at least one of the cameras is an elevated centered overhead camera relative to a scan zone;
a base of the transaction terminal associated with the scan zone;
three vertical bars extending upward from the base at an obtuse angle;
a server comprising a processor to execute executable instructions;
wherein the three cameras configured to provide three different images of a scan zone to the server, wherein each cameras situated on one of three vertical bars of the transaction terminal and attached to a corresponding top portion of a corresponding vertical bar;
wherein the processor configured to:
identify each item placed within the scan zone from each of the three different images based at least on a calculated distance between each camera and a corresponding item present in the scan zone using the corresponding image captured by the corresponding camera;
crop each item from the three different images into three cropped images;
obtain visual features for each item from the corresponding three cropped images;
classify the visual features of each item to a specific item category;
identify an item identifier for each item using the corresponding visual features and the corresponding specific item category;
obtain item information and item pricing for each item identifier; and
provide the item identifier, the item information, and the item pricing for each item placed within the scan zone to the transaction terminal to process during a checkout at the transaction terminal.

19. The system of claim 18 further comprising, a weigh scale to provide an item weight for a given item based on a given item identifier, wherein the weigh scale is integrated into the base.

* * * * *